April 21, 1970 TOSHIYUKI MATSUDA 3,508,081

CIRCUIT ARRANGEMENT FOR SUPPLYING A CURRENT SIGNAL TO ONE OR TWO LOADS

Filed Aug. 15, 1967

INVENTOR.
TOSHIYUKI MATSUDA
BY M. Michael Carpenter
ATTORNEY.

United States Patent Office 3,508,081
Patented Apr. 21, 1970

3,508,081

CIRCUIT ARRANGEMENT FOR SUPPLYING A CURRENT SIGNAL TO ONE OR TWO LOADS

Toshiyuki Matsuda, Chigasaki-shi, Japan, assignor to Honeywell Inc., Minneapolis, Minn., a corporation of Delaware Filed Aug. 15, 1967, Ser. No. 660,803
Claims priority, application Japan, Aug. 17, 1966, 41/53,677
Int. Cl. H03k 17/60
U.S. Cl. 307—255 4 Claims

ABSTRACT OF THE DISCLOSURE

There is disclosed a simple transistor circuit whereby a signal may be applied simultaneously to two different load devices one of which has its common or reference lead connected to the negative side of a supply line and the other of which has its common or reference lead connected to the positive side of the supply line. The circuit involves a pair of transistors of opposite conductivity type so interconnected that the current through one of the transistors is made to follow the current through the other transistor; the current through the other transistor being that derived from a constant current signal source.

The present invention relates to electronic apparatus, and more particularly to control circuits for applying a control signal simultaneously to two different load devices.

In the art relating to process control systems, the complexity of instrumentation combinations has substantially increased. In such systems it is not unusual to find a requirement that a control signal be applied simultaneously to two different load devices. These load devices are of various kinds and include such devices which may be considered signal generators, signal converters, signal receivers and the like.

In the various aspects of these load devices, some are so designed as to require that the common or reference load thereof be connected to the negative side of a power source. Others are so designed as to require that the common or reference lead thereof be connected to the positive side of a power source. Heretofore, when it was necessary to connect two such dissimilar devices in a circuit to be supplied with the same control signal, the resulting circuit was very complex. Often the complexity is compounded by the requirement of additional apparatus such as D.C. to D.C. converters, isolators and the like, all of which are troublesome in D.C. circuits.

Accordingly, it is an object of the present invention to provide improved circuit means for obviating the complexity of the prior art schemes.

It is another object of the present invention to provide improved circuit means as set forth which are simple in both construction and operation and which avoids interaction between the load devices.

It is a further object of the present invention to provide improved circuit means as set forth wherein the ratio of the signal current supplied to one load device to the signal current supplied to a second load device may be controlled and predetermined.

In accomplishing these and other objects, there has been provided, in accordance with the present invention, a transistor control circuit for controlling the current to two different load devices. The circuit includes a pair of transistors of opposite conductivity type so interconnected that the current through one of the transistors is determined by a bias signal derived from the current flowing through the other transistor. The two load devices are connected, respectively, in the load circuit of the two transistors.

A better understanding of the present invention may be had from the following detailed description when read in connection with the accompanying drawing, in which.

Figure 1:
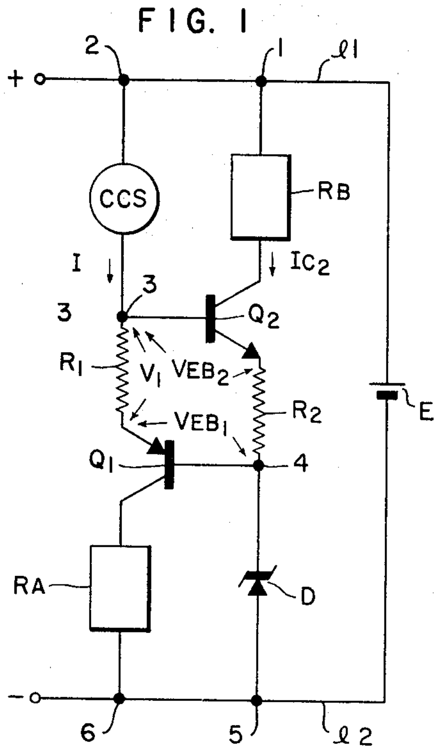
FIGURE 1 is a schematic diagram of a circuit embodying the present invention.

Referring now to the drawings in more detail, there is shown in FIGURE 1 first and second leads, $l_1$ and $l_2$, respectively, connected to the opposite terminals of a D.C. power supply represented by the battery E. Thus, the lead $l_1$ constitutes the positive side of the supply line while the lead $l_2$ constitutes the negative side of the supply line. Connected to the positive lead $l_1$ at a junction 2 is one terminal of an input signal source CCS comprising a constant current signal source. As used herein, the term constant current signal source shall mean a signal source which produces a constant current output for any particular input or control condition, although the current will obviously vary with variations in the input control condition. The other terminal of the source CCS is connected to a junction 3. Also connected to the junction 3 is the base electrode of an NPN transistor $Q_2$ and one lead of a resistor $R_1$. The other lead of the resistor $R_1$ is connected to the emitter electrode of a PNP transistor $Q_1$. The collector of the transistor Q is connected through a load device $R_A$ to the negative side $l_2$ of the supply line at a junction 6.

A second load device $R_B$ is connected, at a junction 1, to the positive side $l_1$ of the supply line. The other lead of the second load device is connected to the collector of the transistor $Q_2$. The emitter of the transistor $Q_2$ is connected, through a resistor $R_2$, to a junction 4. The junction 4, in turn, is connected to the base electrode of the transistor $Q_1$ and, through a constant voltage device represented by the Zener diode D, to the negative side $l_2$ of the supply line at a junction 5.

In operation, the signal source CCS provides a controlled or constant current signal which tends to divide at the junction 3, part of the signal current going to the base electrode of the transistor $Q_2$ and part going through the resistor $R_1$, the emitter-collector path of the transistor $Q_1$, the load device $R_A$ to the junction 6 on the lead $l_2$. However, since the transistors $Q_1$ and $Q_2$ are both high gain transistors, the base current drawn by the two transistors is substantially negligible. Therefore, the signal current I from the constant current source may be considered as entirely flowing through the resistor $R_1$ and the load $R_A$.

Now as a current flows through the resistor $R_1$, a voltage $V_1$ is developed thereacross. That voltage $V_1$ is summed with the emitter-base interelectrode voltage $Veb_1$ of the transistor $Q_1$ and the resultant voltage $(V_1+Veb_1)$ is applied across the base-emitter input terminal of the transistor $Q_2$ via the resistor $R_2$. This comprises an input signal for the transistor $Q_2$ which results in a current $I_{C2}$ flowing through the load device $R_B$, the emitter-collector path of the transistor $Q_2$, the resistor $R_2$ and the constant voltage device D.

It may be seen that the current $I_{C2}$ will assume a value which satisfies the equation $V_1+Veb=R_2I_{C2}+Veb_2$ since the transistor $Q_2$ forms an emitter follower amplifier having $R_2$ as a negative feedback resistor. When the values of the circuit elements are so chosen that the voltage is large with respect to the voltage $(Veb_1-Veb_2)$, the relation becomes $$I_{C2}=\frac{R_1I}{R_2}$$

Although the values of $Veb_1$ and $Veb_2$ may vary with variations in ambient temperature, the transistors $Q_1$ and $Q_2$ are connected in such direction that the thermal elements $\Delta\ Veb_1$ and $\Delta Veb_2$ offset each other so that the influence due to the variations in ambient temperature is equal to $(\Delta Veb_1-\Delta Veb_2)$ a value which is very small with respect to $V_1$ and may be neglected.

From the foregoing, it may be seen that if the resistors $R_1$ and $R_2$ are so selected that their resistances are equal, the collector current $I_{C2}$ of the transistor $Q_2$ is equal to the signal current I through the transistor $Q_1$. Thus, the currents through the two load devices $R_A$ and $R_B$ will be equal. It should also be noted that, since the transistors $Q_1$ and $Q_2$ are current control devices, there is no interaction between the two load devices.

If, on the other hand, it is desired to have the signal applied to one of the load devices to bear a ratio relationship to the current supplied to the other load device other than 1:1, it is only necessary to change the ratio of the values of the resistors $R_1$ and $R_2$ accordingly. Thus, if it is desired to have the current supplied to the load $R_B$ equal to one-half the current supplied to the load $R_A$, it is only necessary to make the resistance of $R_2$ equal to twice the resistance of $R_1$.

Figure 2:
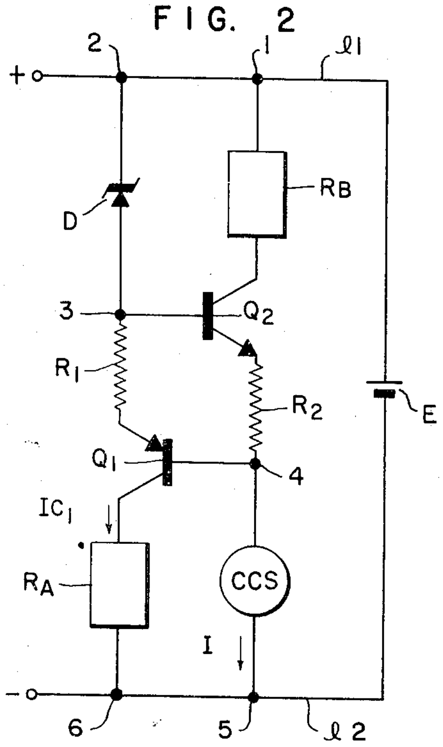
FIGURE 2 is a schematic diagram of a different circuit arrangement also embodying the present invention.

In FIGURE 1 the invention has been described in connection with a combination wherein the constant current signal source CCS has its common or reference terminal connected to the positive side of the supply line, the load device $R_A$ has its common or reference terminal connected to the negative side of the supply line, and the load device $R_B$ has its common or reference terminal connected to the positive side of the supply line. In FIGURE 2 there is illustrated a circuit embodying the invention and which differs from the circuit of FIGURE 1 only in that the input source CCS is one wherein the common or reference terminal must be connected to the negative side of the supply line. The connection of the several elements of the circuit shown in FIGURE 2 is exactly the same as the connection of the elements shown in FIGURE 1 with the exception that the location of the input signal source CCS and the constant voltage device are interchanged. Thus, the constant voltage device $D_1$ in FIGURE 2, is connected between the junctions 2 and 3 while the signal source CCS is connected between the junctions 4 and 5. In this configuration, the relative functions are the same as those in FIGURE 1 except that the signal current I now flows through the transistor $Q_2$ and the load $R_B$ and the subsidiary controlled current $I_{C1}$ flows through the transistor $Q_1$ and the load device $R_A$. Other than this, the connections and functions of the circuit shown in FIGURE 2 is identical to those of the circuit shown in FIGURE 1.

Figure 3:
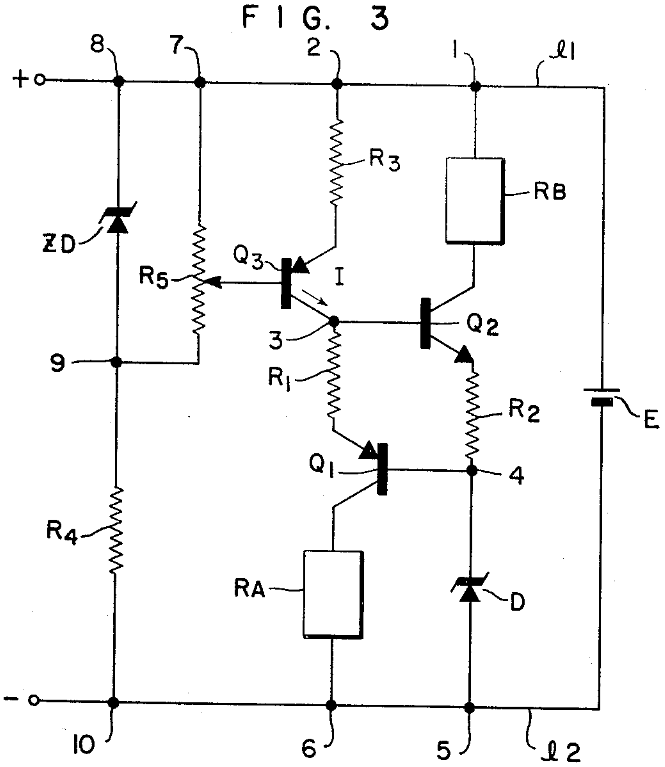
FIGURE 3 is a schematic diagram of a circuit corresponding to that of FIGURE 1 but showing details of one form of input control signal circuit.

In FIGURE 3, there is shown a circuit which is the same as that shown in FIGURE 1 with the exception that details are shown of a partcular input signal source CCS in place of the symbol shown in FIGURE 1. In FIGURE 3 the constant current signal source is shown as including a PNP transistor $Q_3$ having its collector connected to the junction 3 and its emitter connected through a resistor $R_3$ to the positive lead $l_1$ at the junction 2. A control circuit is provided for the transistor $Q_3$ and comprises a voltage divider connected across the supply line $l_1$–$l_2$ at the junctions 8 and 10. This voltage divider includes a resistor $R_4$ connected in series with a constant voltage device represented by the Zener diode ZD. Irrespective of possible variations in line voltage, a constant voltage is developed across the Zener diode ZD between the junctions 8 and 9, the junction 9 being the junction between the diode ZD and the resistor $R_4$. A slide wire resistor $R_5$is connected in parallel with the diode ZD to provide a selectably variable voltage source. A slider on that slide wire resistor $R_5$ is directly connected to the base electrode of the transistor $Q_3$.

For any particular setting of the slider on the slide wire resistor, a predetermined control voltage will be applied as input signal to the base electrode of the transistor $Q_3$. With such a controlled voltage input, the transistor $Q_3$ will cause a predetermined current to flow in the emitter-collector path of the transistor $Q_3$. So long as the input voltage applied to the base electrode of the transistor $Q_3$ is constant, the current resulting in the emitter-collector path of the transistor $Q_3$ will also be constant irrespective of the condition of load imposed on the circuit. However, if the input voltage is varied, as by moving the slider on the slidewire resistor $R_5$, the current through the transistor $Q_3$ will vary accordingly. In other words, the current through the transistor $Q_3$ is constant for any value of input voltage signal and is controlled only by that input voltage signal. While the means for varying the input voltage signal has been illustrated as a slide wire $R_5$, it will be appreciated that this is merely representative of any number of control means for providing a variable control signal to the control operation of the constant current transistor $Q_3$.

The remainder of the circuit of FIGURE 3 operates in the manner set forth in the discussion in connection with FIGURE 1.

Thus it may be seen that there has been provided, in accordance with the present invention, a simple transistor circuit which permits two different load devices to be simultaneously controlled by a single input control signal without interaction between the load devices.

What is claimed is:

1. A control circuit for applying a control signal simultaneously to two different load devices, said circuit comprising a first and a second transistor of opposite conductivity type, said first and second transistor each having a base electrode, a collector electrode and an emitter electrode; a supply line including a positive and a negative lead; a first series circuit connected across said supply line between said positive and negative leads; said first series circuit including a constant current signal source means, a first resistor, the emitter-collector path of said first transistor and a first load device; a second series circuit connected across said supply line between said positive and negative leads and in parallel with said first series circuit; said second series circuit including a constant voltage device, a second resistor, the emitter-collector path of said second transistor and a second load device; said constant voltage device being directly connected to one of said leads and said constant current device being directly connected to the other of said leads, means connecting the base electrode of said first transistor to the junction between said constant voltage device and said second resistor; and means connecting said base electrode to said second transistor to the junction between said constant current signal source means and said first resistor whereby the current flowing in said second series circuit is determined and controlled by the current flowing in said first series circuit.

2. The invention as set forth in claim 1 wherein said first load device has a common or reference terminal connected to the one of said supply line leads opposite from that to which said constant current signal source means is connected and said second load device has a common or reference terminal connected to the one of the supply line leads opposite from that to which said constant voltage device is connected.

3. The invention as set forth in claim 2 wherein said first transistor is a PNP transistor and said second transistor is an NPN transistor.

4. The invention as set forth in claim 2 wherein said first transistor is an NPN transistor and said second transistor is a PNP transistor.

References Cited

UNITED STATES PATENTS

| | | | |
|---|---|---|---|
| 2,655,609 | 10/1953 | Shockley | 307—318 X |
| 3,271,528 | 9/1966 | Vallese | 307—299 |

DONALD D. FORRER, Primary Examiner

B. P. DAVIS, Assistant Examiner

U.S. Cl. X.R.

307—288, 297, 313